US 6,589,125 B1

(12) United States Patent
Tsai

(10) Patent No.: US 6,589,125 B1
(45) Date of Patent: Jul. 8, 2003

(54) COMPOUND MATERIAL FRAME BODY WITHOUT THE NEED OF DRILLING HOLES

(75) Inventor: Ming-Jen Tsai, Miaoli Hsien (TW)

(73) Assignee: Marshal Industrial Corporation, Miaoli Hsien (TW)

( * ) Notice: Subject to any disclaimer, the term of this patent is extended or adjusted under 35 U.S.C. 154(b) by 0 days.

(21) Appl. No.: 10/191,561

(22) Filed: Jul. 10, 2002

(51) Int. Cl.[7] .................... A63B 49/10; B60B 21/06
(52) U.S. Cl. ................ 473/539; 473/535; 473/540; 301/95.102
(58) Field of Search .................. 473/535, 536, 473/539, 547, 524, 540; 301/501, 55, 95.101, 95.102, 95.103

(56) References Cited

U.S. PATENT DOCUMENTS 5,516,100 A * 5/1996 Natsume ................. 473/535
6,071,203 A * 6/2000 Janes et al. ............. 473/535

FOREIGN PATENT DOCUMENTS

| JP | 6-105933 | * | 4/1994 | .......... A63B/49/10 |
| JP | 6-238015 | * | 8/1994 | .......... A63B/49/10 |

* cited by examiner

Primary Examiner—Raleigh W. Chiu
(74) Attorney, Agent, or Firm—Rosenberg, Klein & Lee

(57) ABSTRACT

The present invention provides a compound material frame body without the need of drilling holes. A plurality of symmetric embedded tubes are clamped between two compound material pipe bodies. An outmost compound material layer sheathes the compound material pipe bodies and the embedded tubes with two openings of each of the embedded tubes being exposed. An integrally formed compound material frame body having through holes can immediately be obtained by blowing and heating in a mold. Because there is no need of drilling holes, the structure of the frame body will not be damaged. Moreover, the present invention can achieve the effects of simple manufacturing process, short manufacturing time, and reduced cost.

5 Claims, 5 Drawing Sheets

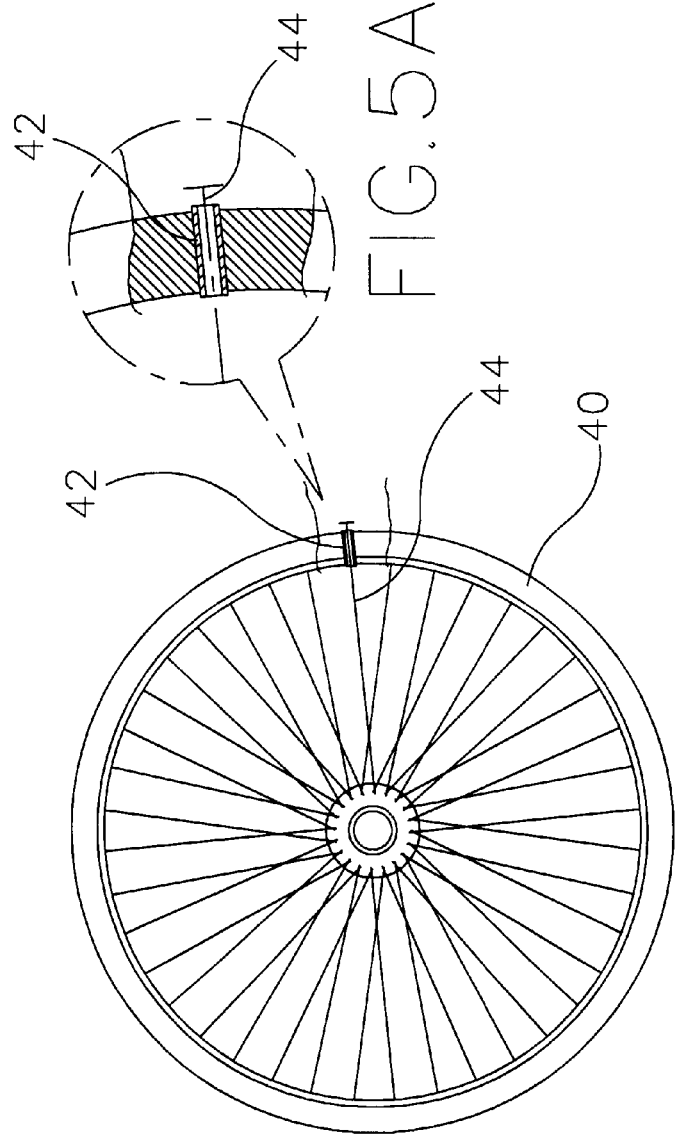

COMPOUND MATERIAL FRAME BODY WITHOUT THE NEED OF DRILLING HOLES

FIELD OF THE INVENTION

The present invention relates to a compound material frame body structure and, more particularly, to a compound material frame body applicable to racket frames or wheel frames of bicycles without the need of drilling holes.

BACKGROUND OF THE INVENTION

Because compound materials have the same hardness and a lighter weight as compared to metallic materials, they have been much appreciated by people. Compound materials can be used to manufacture racket frames and wheel frames of bicycles.

With a racket frame as an example, when manufacturing a conventional racket, compound material in a mold is blown to form a racket frame 10, as shown in FIG. 1. A driller 12 is then used to drill at the periphery of the racket frame 10 to form many circular holes (not shown), which are passed through by meshes. However, this way of forming the circular holes is cumbersome, time-consuming, and expensive. Moreover, because the drilled edges are sharper, the meshes passing therethrough may easily break due to abrasion.

One method is proposed in the prior art to solve the above drawback of easy break of the meshes due to abrasion. As shown in FIG. 2, a straight nail 14 is slipped onto each of the original circular holes at the periphery of the racket frame 10 to let the circular holes become through holes with smoother edges. However, in addition to drilling the circular holes in advance, it is also necessary to additionally manufacture the straight nails and then slip them onto the circular holes in this method, which will waste much time and cost. Moreover, the above two methods need to drill holes in compound material so, the structural hardness will be badly affected. Therefore, the durability of the racket frame will be reduced, and its lifetime of use will be shortened.

Accordingly, the present invention aims to propose a compound material frame body without the need of drilling holes so as to apply to racket frames and wheel frames of bicycles.

SUMMARY OF THE INVENTION

The primary object of the present invention is to propose a compound material frame body without the need of drilling holes. A compound material frame body having through holes can be immediately obtained by blowing and shaping compound material in a mold. Because there is no need of drilling holes, the structure of the frame body will not be damaged.

Another object of the present invention is to propose a compound material frame body without the need of drilling holes so as to achieve the effects of simple manufacturing process, short manufacturing time, and reduced cost.

To achieve the above objects, in the present invention, a plurality of symmetric embedded tubes are clamped between at least two compound material pipe bodies. Another compound material layer sheathes the compound material pipe bodies with two openings of each of the embedded tubes being exposed. An integrally formed frame body structure is thus formed, wherein the embedded tubes can be passed through by meshes or steel wires.

The various objects and advantages of the present invention will be more readily understood from the following detailed description when read in conjunction with the appended drawings, in which:

BRIEF DESCRIPTION OF THE DRAWINGS

FIG. 5 is a structure diagram of another embodiment of the present invention; and FIG. 5A is a partly structural cross-sectional view of FIG. 5.

DETAILED DESCRIPTION OF THE PREFERRED EMBODIMENTS

In the present invention, a plurality of symmetric embedded tubes are preset between compound materials. A compound material frame body with through holes formed of the embedded tubes is immediately obtained after blowing and shaping compound material in a mold without the need of drilling holes. The through holes can then be passed through by meshes or steel wires. The present invention can apply to racket frames or wheel frames of bicycles. A racket frame structure will be described below to illustrate the present invention.

Figure 1:
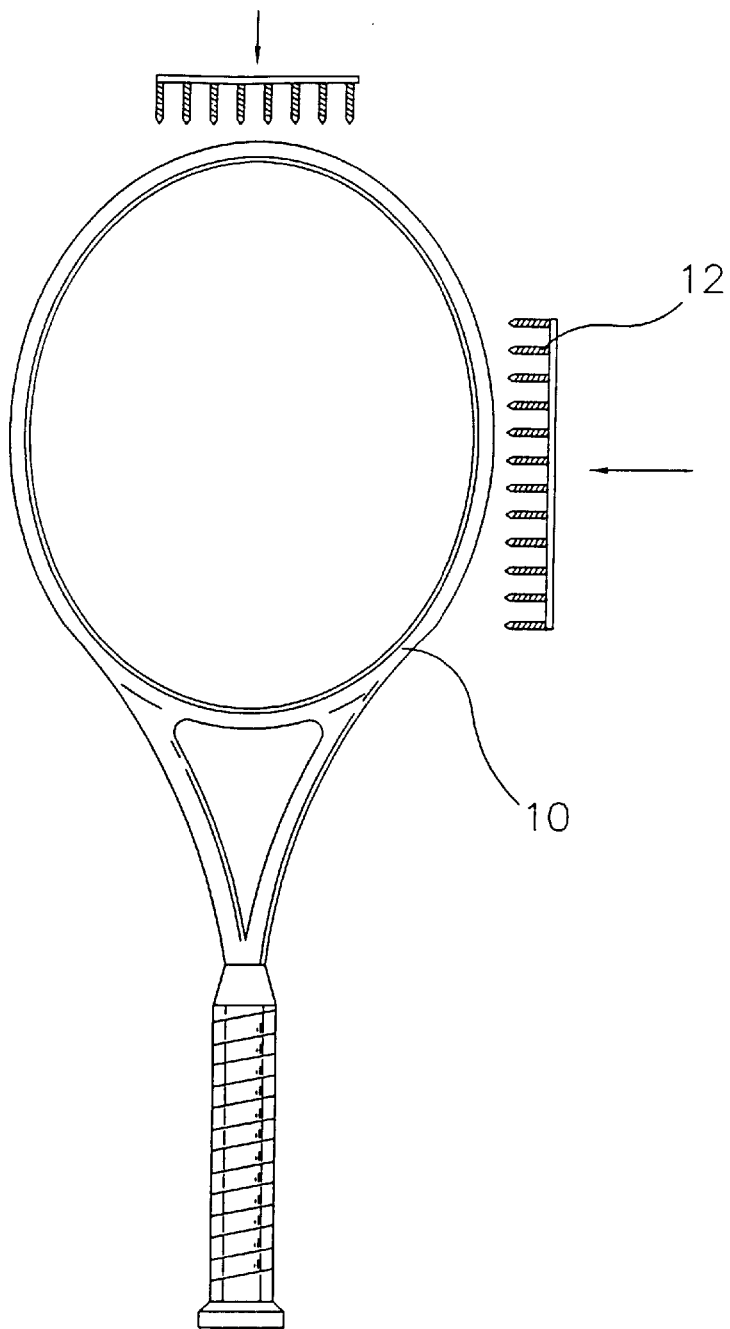
FIG. 1 is a diagram showing the hole drilling process of a racket frame in the prior art.
Figure 2:
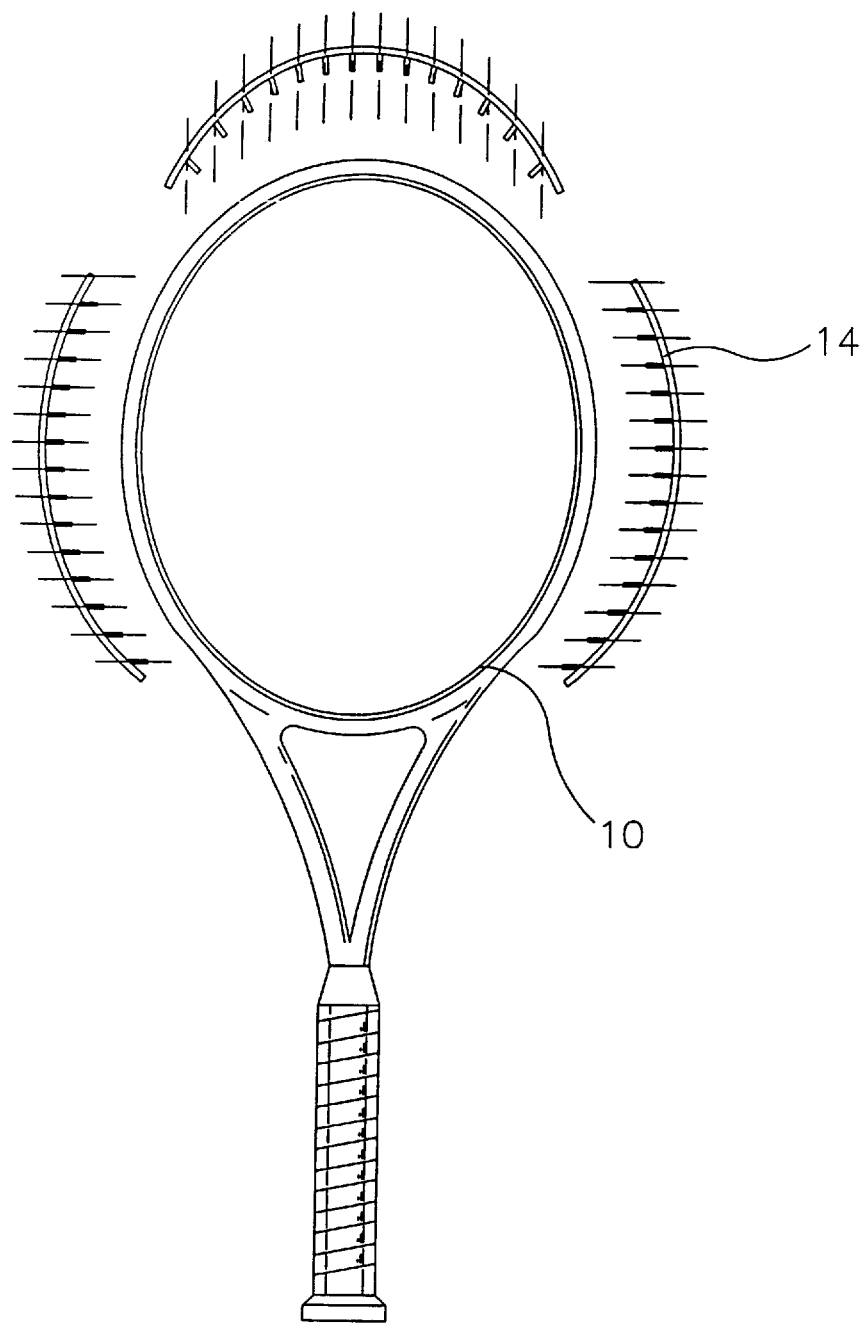
FIG. 2 is a diagram showing the process of slipping straight nails into a racket frame in the prior art.
Figures 3, 3A:
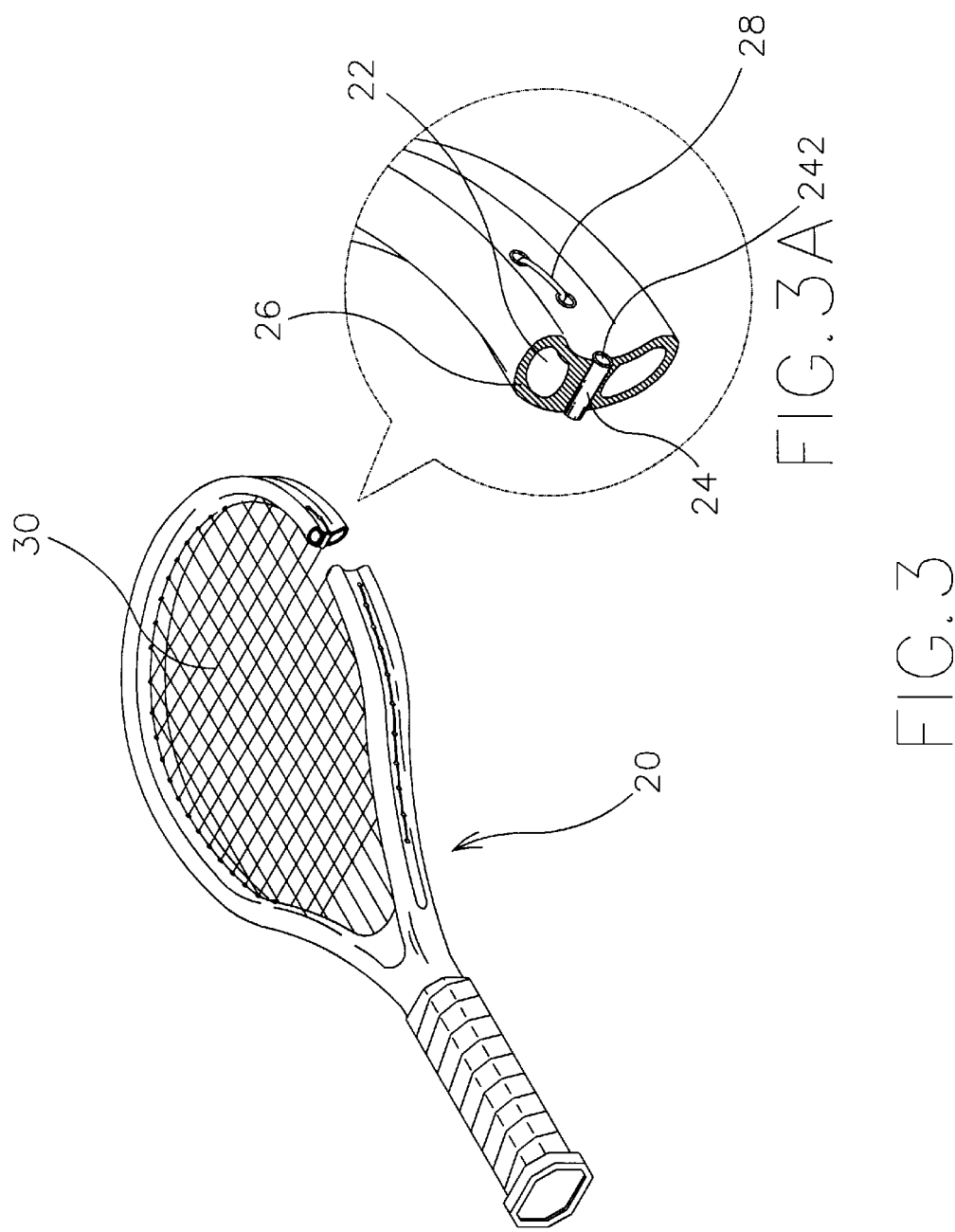
FIG. 3 is a structure diagram of an embodiment of the present invention.
FIG. 3A is a partly structural cross-sectional view of FIG. 3.

As shown in FIG. 3 and FIG. 3A, a compound material racket frame 20 without the need of drilling holes comprises two compound material pipe bodies 22 and 22', a plurality of symmetric embedded tubes 24 clamped between the two pipe bodies 22 and 22', and a compound material layer 26 sheathing at the outmost layer. The, compound material layer 26 completely sheathes the two compound material pipe bodies 22 and 22' with two openings 242 of each of the embedded tubes being exposed. An integrally formed frame body structure is thus formed.

Figure 4A:
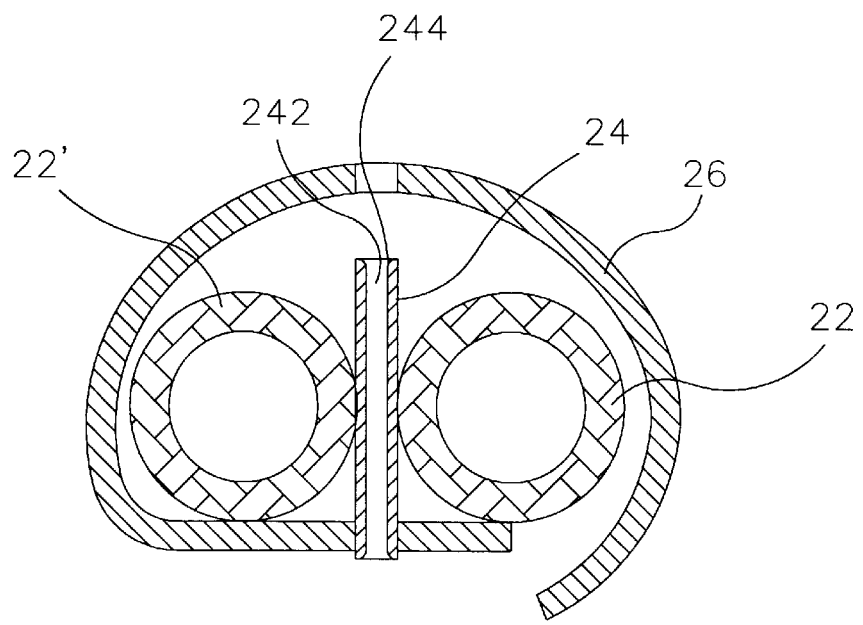
FIGS. 4A and 4B are structural cross-sectional views of FIG. 3 before and after integral formation, respectively.
Figure 4B:
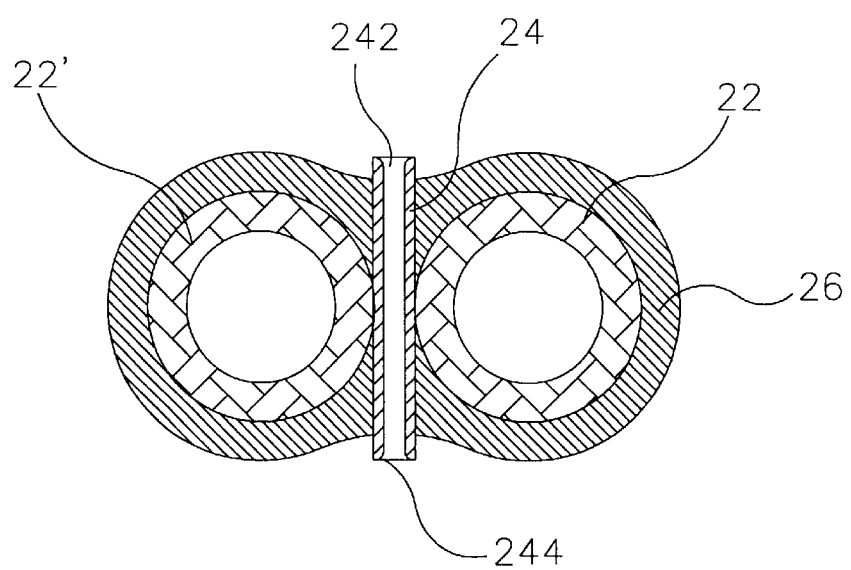

Before the racket frame 20 is integrally formed, the embedded tubes 24 are first clamped between the two hollow and long compound material pipe bodies 22 and 22', as shown in FIG. 4A. The compound material layer 26 at the outmost layer completely sheathes the compound material pipe bodies 22 and 22' and the embedded tubes 24 with the two openings 242 of each of the embedded tubes 24 being exposed. There materials are then placed in a mold and blown and heated so that the compound material pipe bodies 22 and 22' and the compound material layer 26 are integrally connected together, as shown in FIG. 4B. The integrally formed racket frame 20 can thus be obtained after being bended into a curved shape.

Please simultaneously refer to FIG. 3, FIG. 3A and FIG. 4B. The embedded tubes 24 uniformly disposed in the racket frame 20 are matched with the exposed openings 242 to form through holes, which are passed through by meshes 28 to form a spherical plane 30. The inner edges of the openings 242 of the embedded tubes 24 are curved edges 244 to prevent from breaking the meshes 28 due to abrasion. Besides, the bore of the inner openings 242 of the embedded tubes 24 near the spherical plane 30 of the racket frame 20 is larger than that of the outer openings 242 of the racket frame 20 so that the swing angle of the meshes 28 in the embedded tubes 24 due to the action force will increase to provide a larger effective hitting area.

As shown in FIG. 5 and FIG. 5A, in addition to applying to the above racket frame structure, the compound material frame body without the need of drilling holes can also apply to a bicycle wheel frame, wherein a plurality of embedded tubes to be passed through by steel wires 44 are uniformly disposed in a bicycle wheel frame 40.

To sum tip, in the present invention, a compound material frame body having through holes can immediately be obtained by blowing and shaping compound material in a mold. Because there is no need of drilling holes, the structure of the frame body will not be damaged. Moreover, the present invention has the effects of simple manufacturing process, short manufacturing time, and reduced cost.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

I claim:

1. A compound material frame body without the need of drilling holes comprising at least two compound material pipe bodies, a plurality of symmetric embedded tubes being clamped between said compound material pipe bodies, another compound material layer being provided to sheathe said compound material pipe bodies with two openings of each of said embedded tubes being exposed so as to form an integral frame body structure.

2. The compound material frame body without the need of drilling holes as claimed in claim 1, wherein said frame body structure is either a racket frame or a bicycle wheel frame.

3. The compound material frame body without the need of drilling holes as claimed in claim 1, wherein inner edges of said openings of said embedded tubes are arc-shaped edges.

4. The compound material frame body without the need of drilling holes as claimed in claim 1, wherein the bore of one of said two openings of said embedded tube is larger than the other one of said two openings of said embedded tube.

5. The compound material frame body without the need of drilling holes as claimed in claim 1, wherein said compound material pipe bodies, said embedded tubes, and said compound material layer are integrally formed by blowing in a mold.

\* \* \* \* \*